3,420,919
NITRILE AMIDE PHOSPHATES AND PHOSPHONATES

Peter E. Newallis, Morris Plains, and Pasquale Lombardo, East Hanover, N.J., assignors to Allied Chemical Corporation, New York, N.Y., a corporation of New York
No Drawing. Filed June 30, 1965, Ser. No. 468,583
U.S. Cl. 260—940     13 Claims
Int. Cl. C07f 9/38; C07f 9/8; C07f 9/16

This invention relates to the production of novel nitrile amide phosphate and phosphonate pesticidal toxicants and to haloacetamidonitriles useful as intermediates in the preparation of said toxicants.

Accordingly, one object of the invention is to provide new chemical compounds in the form of nitrile amide phosphates and phosphonates. Another object is the provision of novel haloacetamidonitrile compounds. A further object is to provide processes for the production of new nitrile amide phosphate and phosphonate compounds as well as for the production of the haloacetamidonitrile intermediates. A still further object is the provision of novel nitrile amide phosphate and phosphonate compounds as compositions for application as pesticides.

Novel nitrile amide phosphate and phosphonate compounds of the present invention are characterized by the structural formula:

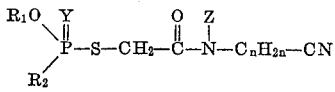

in which Y is a chalcogen selected from the group consisting of oxygen and sulfur, $R_1$ is an alkyl radical, $R_2$ is a member selected from the group consisting of alkyl and alkoxy radicals, $n$ is an integer from 1 to 6 and Z is an aryl radical.

In the above formula, $R_1$ is preferably a lower alkyl radical containing from 1 to 6 carbon atoms and $R_2$ is preferably a member selected from the group consisting of lower alkyl radicals and lower alkoxy radicals containing from 1 to 6 carbon atoms. Illustrative alkyl and alkoxy groups representative of $R_1$ and $R_2$ comprise methyl, methoxy, ethyl, ethoxy, propyl, propoxy, butyl, butoxy, pentyl, pentoxy, hexyl, hexoxy, as well as various isomeric forms thereof. Further, in the alkylene ($C_nH_{2n}$) linkage between the amide and cyano groups, $n$ is an integer from 1 to 6, preferably 1 to 3. Alkylene groups herein contemplated include straight-chain and branched-chain groups such as methylene, ethylene, propylene, isopropylene, butylene and hexylene.

The aryl radicals represented by Z in the above formula comprise phenyl, naphthyl and substituted derivatives thereof, including halo-, alkyl-, alkoxy-, thioalkyl-, haloalkyl-, nitro-, carbalkoxy-, alkanoyl-, phenyl- and phenoxy- derivatives thereof. The substituted derivatives may contain one or more of these substituents and, in the case of polysubstituted derivatives, the groups constituting these substituents may be the same groups, different groups of the same kind, or different kinds of groups. The alkyl-, alkoxy-, thioalkyl-, haloalkyl, alkanoyl-, and carbalkoxy- substitutents herein contemplated may contain from 1 to 4 carbon atoms. Specific examples of Z include phenyl, 2-chlorophenyl, 4-fluorophenyl, 2-fluorophenyl, 3,4-dichlorophenyl, 2,4,6-trichlorophenyl, 2-bromophenyl, 2-chloro-5-trifluoromethylphenyl, 4 chlorophenyl, 4-bromophenyl, 2-chloro-4-fluorophenyl, 2-methylphenyl, 4-methylphenyl, 2-methyl-4-ethylphenyl, 3-chloro-4-methylphenyl, 2-trichloromethylphenyl, 2,4-dimethylphenyl, 2,4,6-trimethylphenyl, 2-dichlorofluoromethylphenyl, 2-trifluoromethylphenyl, 2-methoxyphenyl, 4-methoxyphenyl, 2,4-dimethoxyphenyl, 2-methoxy-4-chlorophenyl, 2-methoxy-4-ethoxyphenyl, 2-thiomethylphenyl, 4-thiomethylphenyl, 3-thiomethylphenyl, 2-chloro-4-thiomethylphenyl, 2,4-di(thiomethyl)phenyl, 2-nitrophenyl, 4-nitrophenyl, 2-acetoxyphenyl, 2-carbethoxyphenyl, 2-carbomethoxyphenyl, 2,4-dicarbethoxyphenyl, 4-phenylphenyl, 4-(4-chlorophenyl) phenyl, 4-(4-methoxyphenyl)phenyl, 4-(4-methylphenyl) phenyl, 4-phenoxyphenyl, naphthyl, 4-chloronaphthyl, 4-fluoronaphthyl, 2-methoxynaphthyl, 4-thiomethylnaphthyl, 2-methylnaphthyl and 2-chloronaphthyl.

The nitrile amide phosphate and phosphonate compounds of this invention may be prepared by reaction of an alkylalkoxy- or a dialkoxy-phosphorothioate compound corresponding to the general formula:

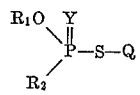

wherein Q is ammonium, an alkali metal such as sodium or potassium or an alkaline-earth metal such as barium or calcium, and $R_1$, $R_2$ and Y have the afore-stated meanings with a haloacetamidonitrile compound conforming to the formula:

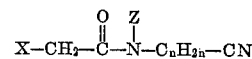

wherein X is a halogen such as chlorine or bromine, and Z and $n$ have the respective meanings set out hereinbefore. The representative reaction of α-chloro[N-(2-cyanoethyl)-N-phenyl]acetamide and ammonium O,O-diethyl phosphorodithioate may be illustrated as follows:

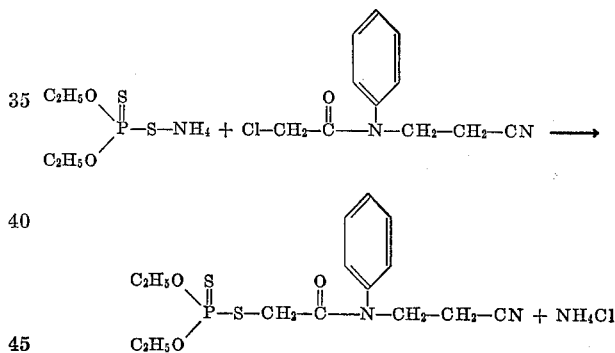

In the above process, the alkylalkoxy- or dialkoxy-phosphorothioate compound may be used as is or, alternatively, may be prepared in situ by reaction of alkylalkoxy- or dialkoxy-thiophosphoric acid with a basic alkali-metal forming metal compound having sufficient alkalinity to neutralize said acid such as ammonium, alkali-metal or alkaline-earth metal carbonates, hydroxides, borates, phosphates and pyrophosphates.

The haloacetamidonitrile compounds, valuable as intermediates in the preparation of the new pesticidally active nitrile amide phosphate and phosphonate compounds, may be prepared by reaction of a haloacetyl halide having the formula:

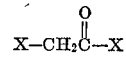

wherein the X's represent the same or different halogen atoms such as chlorine or bromine with a cyanoalkyl- amine described by the formula:

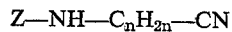

wherein Z and $n$ have the respective meanings set out hereinabove, said reaction being conducted in the presence of a hydrogen halide acceptor. The representative reaction of chloroacetyl chloride and 3-anilino propionitrile using pyridine as a hydrogen halide acceptor may be illustrated thusly:

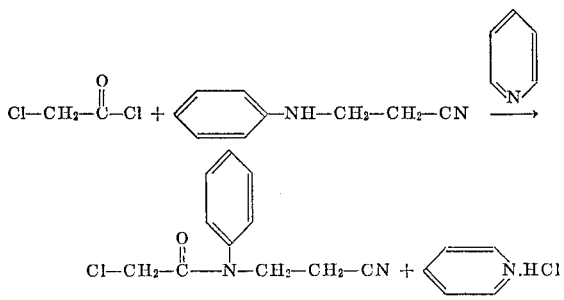

The nitrile amide phosphate and phosphonate compounds of the invention may be prepared by adding the above described alkylalkoxy- or dialkoxy phosphorothioate compound to the haloacetamidonitrile compound with stirring in the presence of an inert organic solvent for one or both of the reactants at a temperature of about −30° C. to 60° C., preferably 0° C. to 30° C. Alternatively, the haloacetamidonitrile compound may be added to the alkylalkoxy- or dialkoxy-phosphorothioate compound. After the reactants are mixed, the reaction mixture is held for about ½ to 100 hours at a temperature of about 0° C. to 30° C. Ammonium, alkali-metal or alkaline-earth metal halide, formed during the reaction, may be removed by any conventional procedure, preferably by filtration, and the solvent may be removed by simple distillation at atmospheric or subatmospheric pressure. The nitrile amide phosphate or phosphonate product, recovered as the distilland, may be further purified as by distillation or recrystallization from the same or different solvent used in the reaction.

The inert organic solvent employable herein is preferably one lower boiling than the nitrile amide phosphate or phosphonate product. Suitable organic solvents include aliphatic alcohols such as methanol and ethanol; ketones such as acetone and diethyl ketone; ethers such as dioxane, diethyl ether, diisopropylether, and di-n-propylether; aromatic hydrocarbons such as benzene, toluene and xylene; and halogenated hydrocarbons such as methylene chloride, chloroform and carbon tetrachloride.

Although the alkylalkoxy- or dialkoxy-phosphorothioate may be charged in molar proportions of 1 mole of haloacetamidonitrile to about 0.5 to 2 moles of alkylalkoxy- or dialkoxy-phosphorothioate, approximately equimolar proportions of the reactants are preferred.

The haloacetamidonitrile compound may be prepared by adding the haloacetyl halide to the above described cyanoalkylamine in the presence of an acid halide acceptor and organic solvent of the class hereinabove described for one or both of the reactants. Molar proportions of about 0.5 to 2 moles of haloacetyl halide per mole of cyanoalkylamine may be conveniently employed, although equimolar proportions of these reactants are preferred. Suitable acid halide acceptors include pyridine, trialkyl amines such as trimethyl amine, triethyl amine, alkali metal carbonates, etc. The addition of the haloacetyl halide is effected slowly at temperatures in the range of about −30° C. to 100° C., preferably at 0° C. to 25° C. with stirring. After completion of the reaction, the insoluble by-product salts, e.g. pyridine hydrochloride, formed during the reaction, may be solubilized by addition of water or a dilute mineral acid, e.g. 10% sulfuric acid, and removed by separation of the resulting aqueous layer. The desired haloacetamidonitrile product is recovered by filtration subsequent to solubilization of the by-product salt. Additional acetamidonitrile product may be recovered as the distilland by distillation of the organic layer filtrate at atmospheric or subatmospheric pressure. The resulting haloacetamidonitrile may be further purified as by distillation or recrystallization from any commonly employed inert organic solvent.

The following examples are given for the purpose of illustrating the present invention but are not intended to be limiting on the scope thereof. In the examples, parts are by weight.

EXAMPLE 1

10 parts of α-chloro[N-(cyanoethyl)N-phenyl]-acetamide were dissolved in 79.2 parts of acetone, and the resulting solution was placed in a reaction vessel provided with a mechanical stirrer. 11 parts of ammonium O,O-diethylphosphorodithioate dissolved in 79.2 parts of acetone rapidly were added to the reaction vessel with stirring at room temperature. Although the reaction appeared to be complete within a one hour period, stirring of the reaction mixture at room temperature was continued for a period of about 45 hours. Approximately 2.3 parts of the ammonium chloride formed as a by-product of the reaction was filtered off and the filtrate was stripped of solvent at subatmospheric pressure to yield an oil which was dissolved in methylene chloride and washed three times with water. The organic extract was dried over magnesium sulfate and stripped in vacuo. A yield of 16 parts (theory 16.7 parts) of α-(diethoxyphosphinothioylthio) - N -(2 - cyanoethyl) - N - phenylacetamide, a viscous oil, having the following structural formula was obtained:

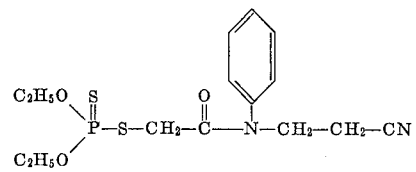

(Compound 1)

This compound was found to contain 8.2% phosphorus (theory 8.34%) and 16.3% sulfur (theory 17.2%). Infrared analysis of the compound showed the presence of the cyano group (4.46 microns) and the amide group (6.02 microns).

The haloacetamidonitrile reactant was prepared in the following manner:

To a reaction vessel containing 36.5 parts of 3-anilino propionitrile and 80 parts of ethyl ether was added 20 parts of pyridine dissolved in 80 parts of ethyl ether. The mixture was stirred to effect solution and cooled to 20° C. A solution of 28.3 parts of chloroacetyl chloride in 60 parts of ethyl ether was added slowly with stirring while maintaining the temperature at approximately 20° C. After completion of the addition, the cooling bath was removed and the stirring was continued for a period of about 18 hours. 300 parts of water were then added to the suspension with stirring thereby forming an aqueous layer and an organic layer. The solid which persisted was filtered and washed with water. The two-phase filtrate was separated and the organic layer was washed twice with water, dried over anhydrous magnesium sulfate and the volatiles were removed therefrom to yield additional solid. The combined solids were recrystallized from ethyl ether to yield 43.5 parts of α-chloro[N-(2-cyanoethyl)-N-phenyl]acetamide, melting point 67–69° C., having the structural formula:

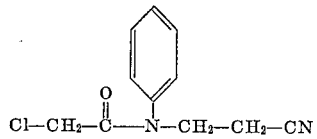

Infrared analysis of this compound showed the presence of the cyano group (4.42 microns) and the amide group (6.00 microns).

EXAMPLE 2

5 parts of α-chloro[N-2-cyanoethyl)-N-phenyl]acetamide were reacted with 5 parts of ammonium O,O-diethylphosphorothioate using the procedure described in Example 1. 8 parts of α-(diethoxyphosphinothio)-N-(2-cyanoethyl)-N-phenyl acetamide, an amber oil, having the following structural formula, as determined by infrared analysis, was obtained:

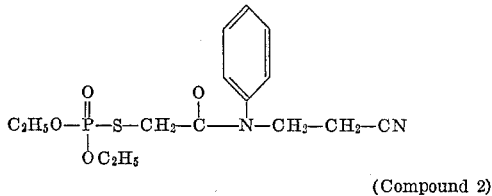

(Compound 2)

This compound was found to contain 8.8% of phosphorus (theory 8.72%) and 8.7% sulfur (theory 9.03%).

EXAMPLE 3

5 parts of α-chloro[N-(2-cyanoethyl)-N-phenyl]acetamide were reacted with 5 parts of ammonium O,O-diethyl phosphorodithioate using the procedure described in Example 1. 6 parts of α-(dimethoxyphosphinothioylthio)-N-(2-cyanoethyl)-N-phenyl acetamide, an amber oil, having the following structural formula, as determined by infrared analysis, was obtained:

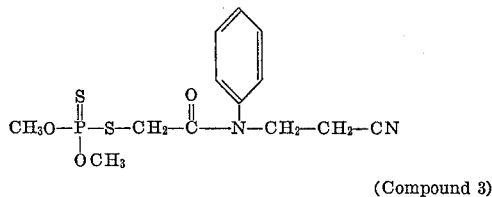

(Compound 3)

This compound was found to contain 10.3% phosphorus (theory 9.02%).

EXAMPLE 4

5.1 parts of α-chloro[N-(2-cyanoethyl)-N-(2-chlorophenyl)] acetamide and 5 parts of ammonium O,O-diethyl phosphorodithioate were reacted using the procedure of Example 1. 8 parts of α-(diethoxyphosphinothioylthio) - N - (2-cyanoethyl) - N - (2-chlorophenyl) acetamide, a viscous oil, having the following structural formula, as determined by infrared analysis, was obtained:

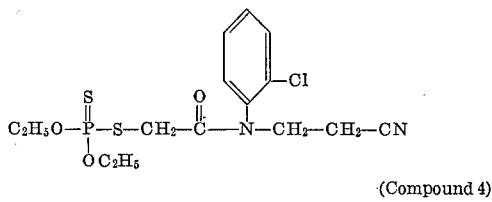

(Compound 4)

This compound was found to contain 45.2% carbon (theory 44.3%) and 6.0% hydrogen (theory 4.92%).

The haloacetamidonitrile reactant was prepared by reaction of 27 parts of 3-(2-chloroanilino) propionitrile, 17 parts of chloroacetyl chloride and 12 parts of pyridine in a manner analogous to that employed in Example 1. 38.5 parts of a brown oil, constituting the following haloacetamidonitrile compound, as determined by infrared analysis, was obtained:

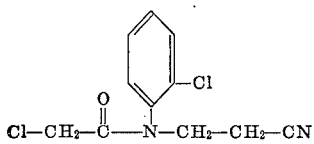

This compound was found to contain 28.5% chlorine (theory 27.6%).

EXAMPLE 5

5.1 parts of α-chloro[N-(2-cyanoethyl)-N-(2-chlorophenyl)] acetamide were reacted with 4 parts of ammonium O,O-dimethyl phosphorodithioate using the procedure described in Example 1. 7 parts of α-(dimethoxyphosphinothioylthio) - N - (2 - cyanoethyl) - N - (2-chlorophenyl) acetamide, having the following structural formula, as determined by infrared analysis, were obtained:

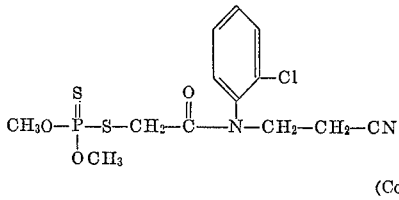

(Compound 5)

This compound was found to contain 41.6% carbon (theory 40.4%) and 4.3% hydrogen (theory 4.15%).

EXAMPLE 6

5.1 parts of α-chloro[N-(2-cyanoethyl)-N-(2-chlorophenyl)] acetamide were reacted with 4 parts of ammonium O,O-diethyl phosphorothioate using the procedure of Example 1. 6.5 parts of α-(diethoxyphosphinothio)-N-(2-cyanoethyl)-N-(2-chlorophenyl) acetamide, a viscous oil, having the following structural formula, as determined by infrared analysis, were obtained:

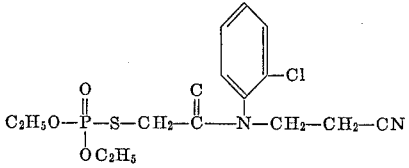

(Compound 6)

This compound was found to contain 47.8% carbon (theory 46.0%) and 4.8% hydrogen (theory 5.10%).

EXAMPLE 7

4.8 parts of α-chloro[N-(2-cyanoethyl)-N-(4-fluorophenyl)] acetamide were reacted with 5 parts of ammonium O,O-diethyl phosphorodithioate using the procedure of Example 1. 8.1 parts of α-(diethoxyphosphinothioylthio)-N-(2-cyanoethyl) - N - (4-fluorophenyl) acetamide, a viscous oil, having the following structural formula, as determined by infrared analysis, were obtained:

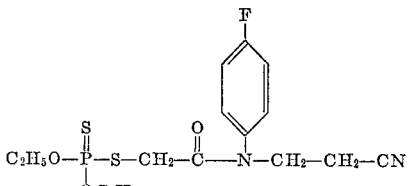

(Compound 7)

This compound was found to contain 45.2% carbon (theory 46.1%) and 5.2% hydrogen (theory 5.12%).

The haloacetamidonitrile reactant was prepared in the following manner:

32.8 parts of 3-(4-fluoroanilino) propionitrile, 22.6 parts of chloroacetyl chloride, and 16 parts of pyridine were reacted in a manner analogous to that employed in Example 1. 48 parts of α-chloro[N-(2-cyanoethyl)-N-(4-fluorophenyl)]acetamide, a solid melting point—85–87° C.) having the following structural formula, as determined by infrared analysis, were obtained:

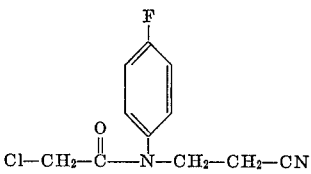

This compound was found to contain 14.8% chlorine (theory 14.5%).

EXAMPLE 8

4.8 parts of α-chloro[N-(2-cyanoethyl)-N-(4-fluorophenyl)]acetamide were reacted with 4 parts of ammonium O,O-dimethyl phosphorodithioate using the procedure of Example 1. 7.6 parts of α-(dimethoxyphosphinothioylthio)-N-(2-cyanoethyl)-N-(4 - fluorophenyl) acetamide, a viscous oil, having the following structural formula, as determined by infrared analysis, was obtained:

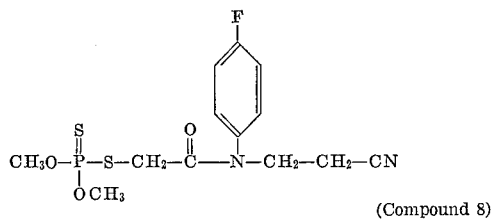
(Compound 8)

This compound was found to contain 17.3% sulfur (theory 17.7%).

EXAMPLE 9

4.4 parts of α-chloro[N-(2-cyanoethyl)-N-(3,4-dichlorophenyl)] acetamide were reacted with 3.3 parts of ammonium O,O-diethyl phosphorodithioate using the procedure of Example 1. 6.8 parts of α-(diethoxyphosphinothioylthio)-N-(2-cyanoethyl)-N - (3,4 - dichlorophenyl) acetamide, a viscous oil, having the following structural formula, as determined by infrared analysis, were obtained:

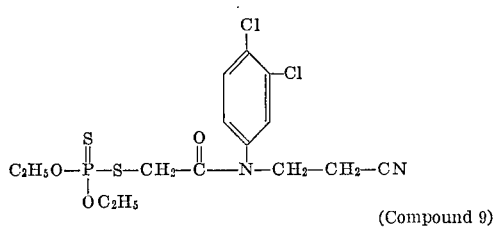
(Compound 9)

This compound was found to contain 41.3% carbon (theory 40.7%) and 4.4% hydrogen (theory 4.3%).

The haloacetamidonitrile reactant was prepared in the following manner:

32.3 parts of 3-(3,4-dichloroanilino) propionitrile, 17 parts of chloroacetyl chloride and 12 parts of pyridine were reacted in a manner analogous to that employed in Example 1. 41.6 parts of α-chloro[N-(2-cyanoethyl)-N-(3,4-dichlorophenyl)] acetamide, a solid (melting point—95–96° C.) having the following structural formula, as determined by infrared analysis, were obtained:

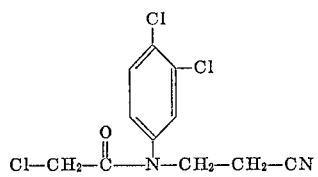

This compound was found to contain 36.2% chlorine (theory 36.4%).

EXAMPLE 10

4.4 parts of α-chloro[N-(2-cyanoethyl)-N-(3,4-dichlorophenyl)] acetamide were reacted with 3 parts of ammonium O,O-dimethyl phosphorodithioate, using the procedure described in Example 1. 6.8 parts of α-(di-methoxyphosphinothioylthio)-N-(2-cyanoethyl) - N - (3,4 - dichlorophenyl) acetamide, a viscous oil, having the following structural formula, as determined by infrared analysis, were obtained:

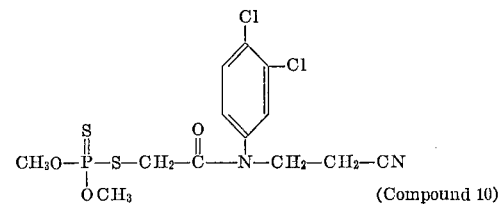
(Compound 10)

This compound was found to contain 16.8% chlorine (theory 17.2%).

EXAMPLE 11

5.1 parts of α-chloro[N-(2-cyanoethyl)-N-(2-methoxyphenyl)] acetamide were reacted with 5 parts of ammonium O,O-diethyl phosphorodithioate using the procedure of Example 1. 8.2 parts of α-(diethoxyphosphinothioylthio)-N-(2-cyanoethyl) acetamide, a viscous oil, having the following structural formula, as determined by infrared analysis, were obtained:

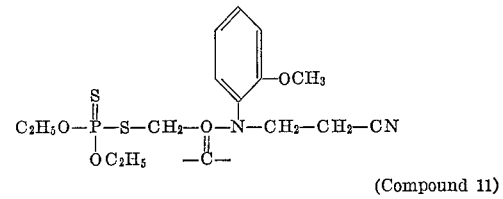
(Compound 11)

This compound was found to contain 16.1% sulfur (theory 16.0%).

The haloacetamidonitrile reactant was prepared in the following manner:

35.2 parts of 3-(2-methoxyanilino) propionitrile, 22.6 parts of chloroacetyl chloride and 16 parts of pyridine were reacted in a manner analogous to that described in Example 1. 49 parts of α-chloro[N-(2-cyanoethyl)-N-(2-methoxyphenyl)] acetamide, a solid (melting point—50–52° C.) having the following structural formula, as determined by infrared analysis, were obtained:

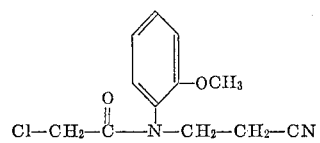

This compound was found to contain 14.1% chlorine (theory 14.1%).

EXAMPLE 12

5.1 parts of α-chloro[N-(2-cyanoethyl)-N-(2-methoxyphenyl)]acetamide were reacted with 4 parts of ammonium O,O-dimethyl phosphorodithioate, using the procedure described in Example 1. 6.7 parts of α-(dimethoxyphosphinothioylthio) - N - (2-cyanoethyl)-N-(2-methoxyphenyl) acetamide, a viscous oil, having the following structural formula, as determined by infrared analysis, were obtained:

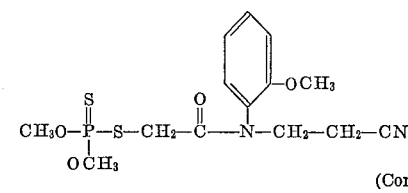
(Compound 12)

EXAMPLE 13

5.1 parts of α-chloro[N-(2-cyanoethyl)-N-(4-methoxyphenyl)] acetamide were reacted with 5.0 parts of ammonium O,O-diethyl phosphorodithioate using the procedure of Example 1. 8.2 parts of α-(diethoxyphosphinothioylthio) - N - (2-cyanoethyl) - N - (4-methoxyphenyl) acetamide, a viscous oil, having the following structural formula, as determined by infrared analysis, were obtained:

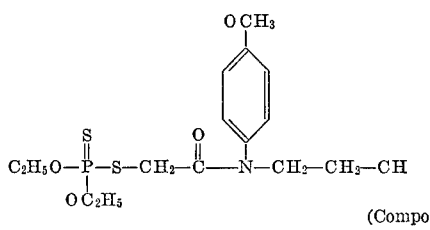

(Compound 13)

This compound was found to contain 15.1% sulfur (theory 16.1%).

The haloacetamidonitrile reactant was prepared in the following manner:

35.2 parts of 3-(4-methoxyanilino) propionitrile, 22.6 parts of chloroacetyl chloride and 16 parts of pyridine were reacted in a manner analogous to that employed in Example 1. 40 parts of α-chloro[N-(2-cyanoethyl)-N - (4 - methoxyphenyl)] acetamide, a solid (melting point—53–54° C.) having the following structural formula, as determined by infrared analysis, were obtained:

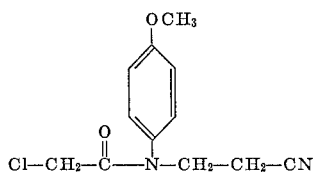

This compound was found to contain 14.2% chlorine (theory 14.1%).

EXAMPLE 14

5.1 parts of α-chloro[N-(2-cyanoethyl)-N-(4-methoxyphenyl)] acetamide were reacted with 4.0 parts of ammonium O,O-dimethyl phosphorodithioate using the procedure of Example 1. 7.0 parts of α-(dimethoxyphosphinothioylthio) - N - (2-cyanoethyl) - N - (4-methoxyphenyl) acetamide, a viscous oil, having the following structural formula, as determined by infrared analysis, were obtained:

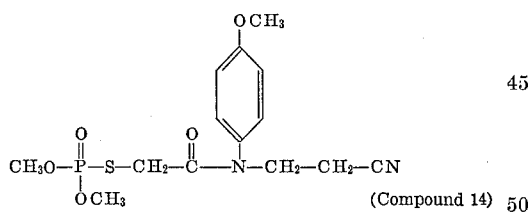

(Compound 14)

This compound was found to contain 17% sulfur (theory 17.1%).

EXAMPLE 15

4.7 parts of α-chloro[N-(2-cyanoethyl)-N-(2-methylphenyl)] acetamide were reacted with 5.0 parts of ammonium O,O-diethyl phosphorodithioate using the procedure of Example 1. 7.0 parts of α-(diethoxyphosphinothioylthio) - N - (2-cyanoethyl) - N - (2-methylphenyl) acetamide, a viscous oil, having the following structural formula, as determined by infrared analysis, were obtained:

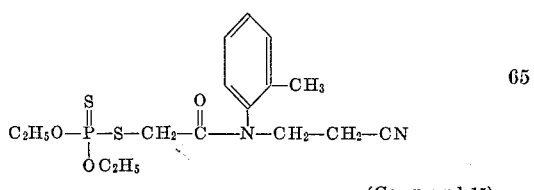

(Compound 15)

This compound was found to contain 16.2% sulfur (theory 17.1%).

The haloacetamidonitrile reactant was prepared in the following manner:

32 parts of 3-(2-methylanilino) propionitrile, 22.6 parts of chloroacetyl chloride, and 16 parts of pyridine were reacted in a manner analogous to that employed in Example 1. 46 parts of a brown oil, constituting the following haloacetamidonitrile compound, as determined by infrared analysis, were obtained:

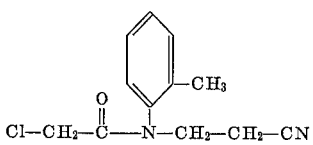

This compound was found to contain 15.2% chlorine (theory 15.0%).

EXAMPLE 16

4.7 parts of α-chloro[N-(2-cyanoethyl)-N-(4-methylphenyl)] acetamide were reacted with 5.0 parts of ammonium O,O-diethyl phosphorodithioate using the procedure of Example 1. 8.0 parts of α-(diethoxyphosphinothioylthio) - N - (2-cyanoethyl) - N - (4-methylphenyl) acetamide, a viscous oil, having the following structural formula, as determined by infrared analysis, were obtained:

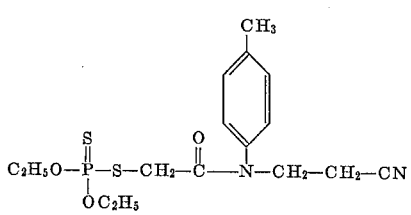

(Compound 16)

This compound was found to contain 16.2% sulfur (theory 17.1%).

The haloacetamidonitrile reactant was prepared in the following manner:

32 parts of 3-(4-methylanilino) propionitrile, 22.6 parts of chloroacetyl chloride and 16 parts of pyridine were reacted in a manner analogous to that employed in Example 1. 39 parts of α-chloro[N-(2-cyanoethyl)-N-(4-methylphenyl)] acetamide, a solid (melting point—56–57° C.) having the following structural formula, as determined by infrared analysis, were obtained:

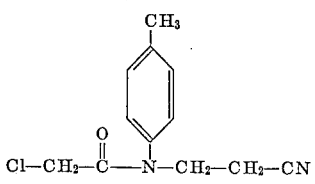

This compound was found to contain 15.1% chlorine (theory 15.0%).

EXAMPLE 17

5.4 parts of α-chloro[N-(2-cyanoethyl)-N-(3-chloro-4-methylphenyl)] acetamide were reacted with 5.0 parts of ammonium O,O-diethyl phosphorodithioate using the procedure of Example 1. 8.5 parts of α-(diethoxyphosphinothioylthio) - N - (2-cyanoethyl)-N-(3 - chloro-4-methyl) acetamide, a viscous oil, having the following structural formula, as determined by infrared analysis, were obtained:

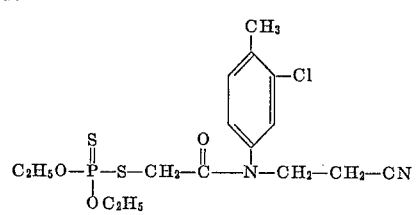

(Compound 17)

This compound was found to contain 8.8% chlorine (theory 8.5%).

The haloacetamidonitrile reactant was prepared in the following manner:

38.9 parts of 3-(3-chloro-4-methylanilino) propionitrile, 22.6 parts of chloroacetyl chloride and 16 parts of pyridine were reacted in a manner analogous to that employed in Example 1. 47 parts of α-chloro[N-(2-cyanoethyl)-N-(3-chloro-4-methylphenyl)] acetamide, a solid (melting point—73–74° C.) having the following structural formula, as determined by infrared analysis, were obtained:

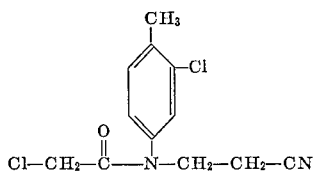

This compound was found to contain 25.9% chlorine (theory 26.2%).

EXAMPLE 18

3.9 parts of α-chloro[N-(2-cyanoethyl)-N-(4-chlorophenyl)] acetamide were reacted with 3.3 parts of ammonium O,O-diethyl phosphorodithioate using the procedure of Example 1. 6.2 parts of α-(diethoxyphosphinothioylthio) - N - (2-cyanoethyl) - N - (4-chlorophenyl) acetamide, a viscous oil, having the following structural formula, as determined by infrared analysis, were obtained:

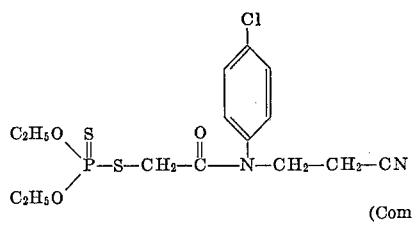

(Compound 18)

This compound was found to contain 8.4% chlorine (theory 8.7%).

The haloacetamidonitrile reactant was prepared in the following manner:

27 parts of 3-(4-chloroanilino) propionitrile, 17 parts of chloroacetyl chloride and 12 parts of pyridine were reacted in a manner analogous to that employed in Example 1. 34 parts of α-chloro[N-(2-cyanoethyl)-N-(4-chlorophenyl)] acetamide, a solid (melting point—79–80° C.) having the following structural formula, as determined by infrared analysis, were obtained:

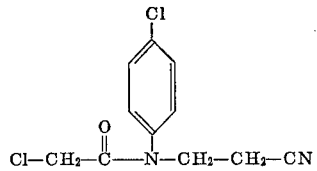

This compound was found to contain 27.3% chlorine (theory 27.6%).

EXAMPLE 19

5.4 parts of α-chloro[N-(2-cyanoethyl)-N-(2-thiomethylphenyl)] acetamide were reacted with 5.0 parts of ammonium O,O-diethyl phosphorodithioate using the procedure of Example 1. 7.6 parts of α-(diethoxyphosphinothioylthio)-N-(2-thiomethylphenyl) acetamide, a viscous oil, having the following structural formula, as determined by infrared analysis, were obtained:

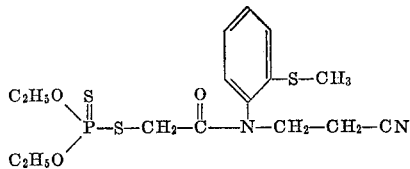

(Compound 19)

The haloacetamidonitrile reactant was prepared in the following manner:

22.4 parts of 3-(2-thiomethylanilino) propionitrile, 13.2 parts of chloroacetyl chloride and 10 parts of pyridine were reacted in a manner analogous to that employed in Example 1. 27 parts of α-chloro[N-(2-cyanoethyl)-N-(2-thiomethylphenyl)] acetamide, an amber oil, constituting the following haloacetamidonitrile compound, as determined by infrared analysis, were obtained:

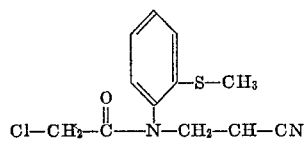

EXAMPLE 20

5.4 parts of α-chloro[N-(2-cyanoethyl)-N-(4-thiomethylphenyl)]acetamide were reacted with 5.0 parts of ammonium O,O-diethyl phosphorodithioate using the procedure of Example 1. 8.2 parts of α-(diethoxyphosphinothioylthio)-N-(4-thiomethylphenyl)acetamide, a viscous oil, having the following structural formula, as determined by infrared analysis, were obtained:

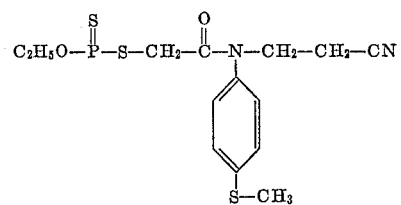

(Compound 20)

This compound was found to contain 20.4% sulfur (theory 22.9%).

The haloacetamidonitrile reactant was prepared in the following manner:

44.8 parts of 3-(4-thiomethylanilino) propionitrile, 22.6 parts of chloroacetyl chloride and 16 parts of pyridine were reacted in a manner analogous to that employed in Example 1. 56 parts of α-chloro[N-(2-cyanoethyl)-N-(4-thiomethylphenyl)] acetamide, a brown oil, constituting the following haloacetamidonitrile compound, as determined by infrared analysis, were obtained:

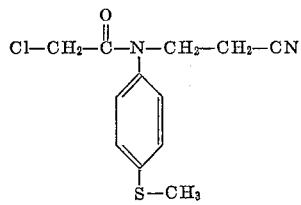

This compound was found to contain 13.7% chlorine, (theory 12.7%).

EXAMPLE 21

5.4 parts of α - chloro[N - (2 - cyanoethyl)-N-(3-thiomethylphenyl)] acetamide were reacted with 5.0 parts of ammonium O,O-diethyl phosphorodithioate using the procedure of Example 1. 7.5 parts of α-(diethoxyphosphinothioylthio) - N - (2 - cyanoethyl) - N - (3 - thiomethyl)acetamide, a viscous oil, having the following structural formula, as determined by infrared analysis, were obtained:

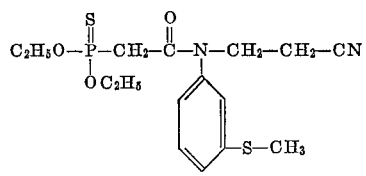

(Compound 21)

This compound was found to contain 22.4% sulfur (theory 22.9%).

The haloacetamidonitrile reactant was prepared in the following manner:

22.4 parts of 3-(3-thiomethylanilino) propionitrile, 11.3 parts of chloroacetyl chloride and 8 parts of pyridine were reacted in a manner analogous to that employed in Example 1. 27.8 parts of α-chloro[N-(2-cyanoethyl)-N-(3-thiomethylphenyl)] acetamide, a brown oil, constituting the following haloacetamidonitrile compound, as determined by infrared analysis, were obtained:

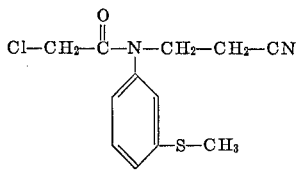

EXAMPLE 22

6.0 parts of α-chloro[N-(2-cyanoethyl)-N-(2-bromophenyl)] acetamide were reacted with 4.4 parts of ammonium O,O-diethyl phosphorodithioate using the procedure of Example 1. 8.3 parts of α-(diethoxyphosphinothioylthio)-N-(2-bromophenyl) acetamide, a viscous oil, having the following structural formula, as determined by infrared analysis, were obtained:

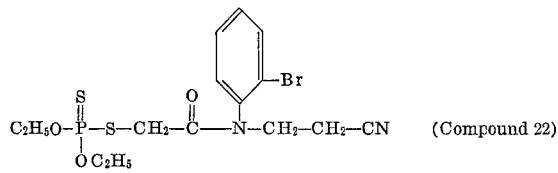 (Compound 22)

This compound was found to contain 7.5% phosphorus (theory 8.4%).

The haloacetamidonitrile reactant was prepared in the following manner:

45 parts of 3-(2-bromoanilino) propionitrile, 22.6 parts of chloroacetyl chloride and 21 parts of pyridine were reacted in a manner analogous to that employed in Example 1. 58.5 parts of α-chloro[N-(2-cyanoethyl)-N-(2-bromophenyl)] acetamide, an oil having the following structural formula, as determined by infrared analysis, were obtained:

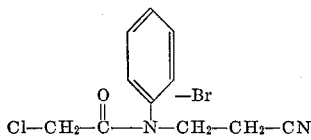

EXAMPLE 23

6.5 parts of α-chloro[N-(2-cyanoethyl)-N-(2-chloro-5-trifluoromethylphenyl)] acetamide were reacted with 4.4 parts of ammonium O,O-diethyl phosphorodithioate using the procedure of Example 1. 7.5 parts of α-(diethoxyphosphinothioylthio) - N - (2 - chloro - 5 - trifluoromethylphenyl) acetamide, a viscous oil, having the following structural formula, as determined by infrared analysis, were obtained:

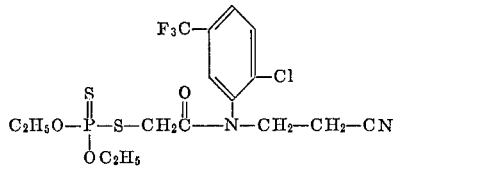

(Compound 23)

The haloacetamidonitrile reactant was prepared in the following manner:

25 parts of 3 - (2 - chloro - 5 - trifluoromethylanilino) propionitrile, 11.3 parts of chloroacetyl chloride and 10.5 parts of pyridine were reacted in a manner analogous to that employed in Example 1. 16 parts of α-chloro[N-(2-cyanoethyl)-N-(2-chloro-5-trifluoromethylphenyl)] acetamide, a solid (melting point—88–91° C.) having the following structural formula, as determined by infrared analysis, were obtained:

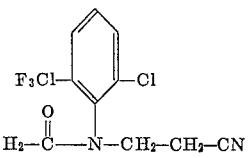

EXAMPLE 24

8.4 parts of α-chloro[N-(2-cyanoethyl)-N-(naphthyl)] acetamide were reacted with 5.4 parts of ammonium O,O-diethyl phosphorodithioate using the procedure of Example 1. 9.5 parts of α-(diethoxyphosphinothioylthio)-N-(naphthyl) acetamide, a viscous oil, having the following structural formula, as determined by infrared analysis, were obtained:

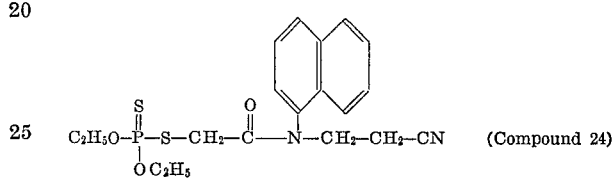 (Compound 24)

This compound was found to contain 8.01% phosphorus (theory 7.4%).

The haloacetamidonitrile reactant was prepared in the following manner:

19.6 parts of 3-(1-naphthylamino) propionitrile, 11.3 parts of chloroacetyl chloride and 8 parts of pyridine were reacted in a manner analogous to that employed in Example 1. 27 parts of α-chloro[N-(2-cyanoethyl)-N-(naphthyl)] acetamide, an oily liquid having the following structural formula, as determined by infrared analysis, were obtained:

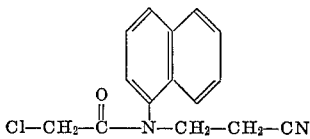

This compound was found to contain 13.0% chlorine (theory 13.1%).

EXAMPLE 25

4.4 parts of α-chloro[N-(2-cyanoethyl)-N-(4-carboethoxyphenyl)] acetamide were reacted with 3.3 parts of ammonium O,O-diethyl phosphorodithioate using the procedure of Example 1. 6.4 parts of α-(diethoxyphosphinothioylthio)-N-(4-carboethoxyphenyl) acetamide, a viscous oil, having the following structural formula, as determined by infrared analysis, were obtained:

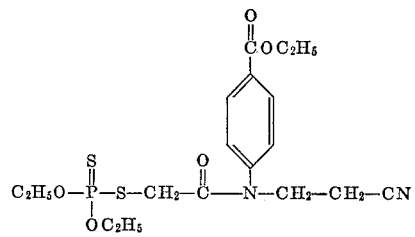

(Compound 25)

The haloacetamidonitrile reactant was prepared in the following manner:

21.8 parts of 3-(4-carboethoxyanilino) propionitrile, 11.3 parts of chloroacetyl chloride and 8 parts of pyridine were reacted in a manner analogous to that employed in Example 1. 28 parts of α-chloro[N-(2-cyanoethyl)-N-(4-carboethoxyphenyl)] acetamide, an oily liquid having the following structural formula, as determined by infrared analysis, were obtained:

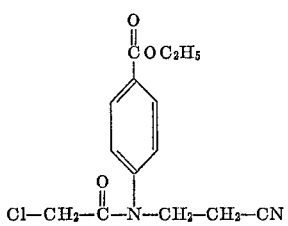

This compound was found to contain 11.0% chlorine (theory 12.0%).

EXAMPLE 26

6.3 parts of α-chloro[N-(2-cyanoethyl)-N-(3-nitrophenyl)] acetamide were reacted with 6.4 parts of ammonium O,O-diethylphosphorodithioate using the procedure of Example 1. 9 parts of α-(diethoxyphosphinothioylthio)-N-(3-nitrophenyl) acetamide, a viscous oil, having the following structural formula, as determined by infrared analysis, were obtained:

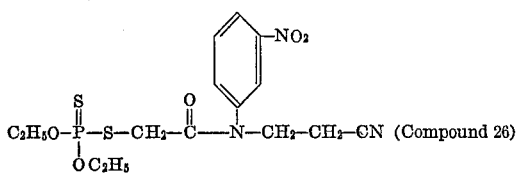

This compound was found to contain 7.76% phosphorus (theory 7.7%).

The haloacetamidonitrile reactant was prepared in the following manner:

19.1 parts of 3-(3-nitroanilino) propionitrile, 11.3 parts of chloroacetyl chloride and 8 parts of pyridine were reacted in a manner analogous to that employed in Example 1. 26 parts of α-chloro[N-(2-cyanoethyl)-N-(3-nitrophenyl)] acetamide, an oily liquid having the following structural formula, as determined by infrared analysis, were obtained:

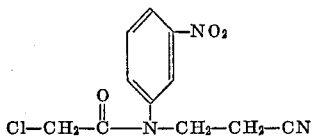

This compound in crude form was found to contain 11.8% chlorine (theory 13.6%).

EXAMPLE 27

5 parts of α-chloro(N-cyanomethyl-N-phenyl) acetamide were reacted with 10 parts of ammonium O,O-diethylphosphorodithioate using the procedure of Example 1. 9 parts of α-(diethoxyphosphinothioylthio)-N-cyanomethyl-N-phenyl acetamide, a viscous oil, having the following structural formula, as determined by infrared analysis, were obtained:

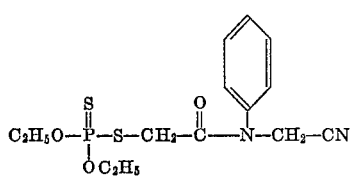

(Compound 27)

This compound was found to contain 19.8% sulfur (theory 17.9%).

The haloacetamidonitrile reactant was prepared in the following manner:

13.2 parts of 2-anilino acetonitrile, 11.3 parts of chloroacetyl chloride and 7.9 parts of pyridine were reacted in a manner analogous to that employed in Example 1.

16 parts of α-chloro(N-cyanomethyl-N-phenyl) acetamide, a solid (melting point—102–104° C.) having the following structural formula, as determined by infrared analysis, were obtained:

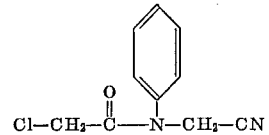

EXAMPLE 28

1 part of α-chloro(N-cyanomethyl-N-phenyl) acetamide was reacted with 2 parts of ammonium O,O-dimethylphosphorodithioate using the procedure of Example 1. 1.5 parts of α-(dimethoxyphosphinothioylthio)-N-cyanomethyl-N-phenyl acetamide, a viscous oil, having the following structural formula, as determined by infrared analysis, were obtained:

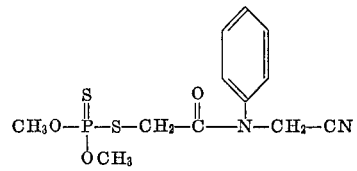

(Compound 28)

This compound was found to contain 10.9% phosphorus (theory 9.4%).

EXAMPLE 29

11 parts of α-chloro[N-(2-cyanoethyl)-N-phenyl] acetamide were reacted with 10 parts of ammonium O-ethyl methylphosphorodithioate using the procedure described in Example 1. 15.5 parts of α-(ethoxymethylphosphinothioylthio)-N-(2-cyanoethyl)-N-phenyl acetamide, an amber oil, having the following structural formula, as determined by infrared analysis, were obtained:

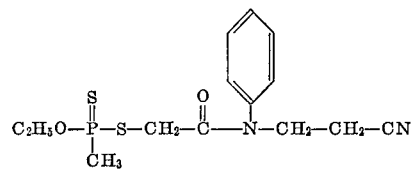

(Compound 29)

This compound was found to contain 8.75% phosphorus (theory 9.06%) and 18.7% sulfur (theory 18.0%).

EXAMPLE 30

5.1 parts of α-chloro[N-(2-cyanoethyl)-N-(2-chlorophenyl)] acetamide were reacted with 4 parts of ammonium O-ethyl methylphosphorodithioate using the procedure described in Example 1. 7.5 parts of α-(ethoxymethylphosphinothioylthio) - N - (2-cyanoethyl)-N-(2-chlorophenyl) acetamide, a viscous oil, having the following structural formula, as determined by infrared analysis, were obtained:

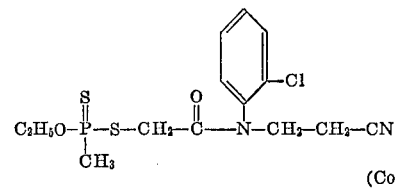

(Compound 30)

This compound was found to contain 44.4% carbon (theory 44.5%).

EXAMPLE 31

4.8 parts of α-chloro[N-(2-cyanoethyl)-N-(4-fluorophenyl)] acetamide were reacted with 4 parts of ammonium O-ethyl methylphosphorodithioate using the procedure described in Example 1. 7.5 parts of α-(ethoxymethylphosphinothioylthio) - N - (2-cyanoethyl)-N-(4-fluorophenyl) acetamide, a viscous oil, having the following structural formula, as determined by infrared analysis, were obtained:

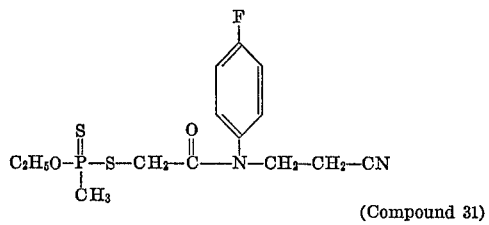

(Compound 31)

This compound was found to contain 17.1% sulfur (theory 17.7%).

EXAMPLE 32

4.4 parts of α-chloro[N-(2-cyanoethyl)-N-(3,4-dichlorophenyl)] acetamide were reacted with 3 parts of ammonium O-ethyl methylphosphorodithioate using the procedure described in Example 1. 6.6 parts of α-(ethoxymethylphosphinothioylthio) - N - (2-cyanoethyl)-N-(3,4-dichlorophenyl) acetamide, a viscous oil, having the following structural formula, as determined by infrared analysis, were obtained:

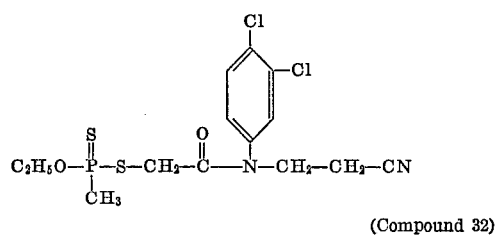

(Compound 32)

This compound was found to contain 17.8% chlorine (theory 17.3%).

EXAMPLE 33

5.1 parts of α-chloro[N-(2-cyanoethyl)-N-(2-methoxyphenyl)] acetamide were reacted with 4 parts of ammonium O-ethyl methylphosphorodithioate using the procedure described in Example 1. 6.8 parts of α-(ethoxymethylphosphinothioylthio) - N - (2-cyanoethyl)-N-(2-methoxyphenyl) acetamide, a viscous oil, having the following structural formula, as determined by infrared analysis, were obtained:

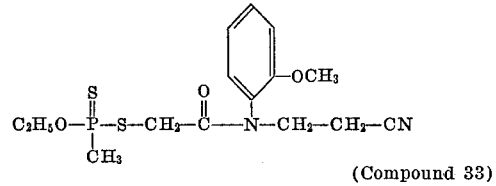

(Compound 33)

This compound was found to contain 16.3% sulfur (theory 17.2%).

EXAMPLE 34

5.1 parts of α-chloro[N-(2-cyanoethyl)-N-(4-methoxyphenyl)] acetamide were reacted with 4 parts of ammonium O-ethyl methylphosphorodithioate using the procedure described in Example 1. 7.3 parts of α-(ethoxymethylphosphinothioylthio) - N - (2-cyanoethyl)-N-(4-methoxyphenyl) acetamide, a viscous oil, having the following structural formula, as determined by infrared analysis, were obtained:

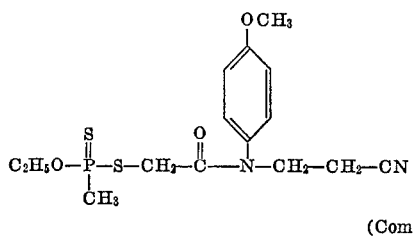

(Compound 34)

This compound was found to contain 16.1% sulfur (theory 17.2%).

EXAMPLE 35

4.7 parts of α-chloro[N-(2-cyanoethyl)-N-(4-methylphenyl)] acetamide were reacted with 4 parts of ammonium O-ethyl methylphosphorodithioate using the procedure described in Example 1. 7.0 parts of α-ethoxymethylphosphinothioylthio) - N - (2-cyanoethyl)-N-(4-methylphenyl) acetamide, a viscous oil, having the following structural formula, as determined by infrared analysis, were obtained:

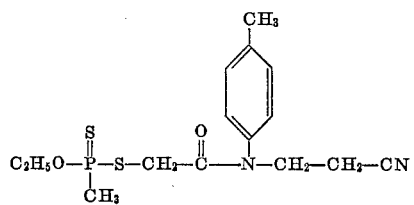

(Compound 35)

This compound was found to contain 18% sulfur (theory 18.5%).

EXAMPLE 36

4.7 parts of α-chloro[N-2-cyanoethyl)-N-(2-methylphenyl)] acetamide were reacted with 4 parts of ammonium O-ethyl methylphosphorodithioate using the procedure described in Example 1. 6.8 parts of α-(ethoxymethylphosphinothioylthio)-N-(2-cyanoethyl) - N - (2-methylphenyl)acetamide, a viscous oil, having the following structural formula, as determined by infrared analysis, were obtained:

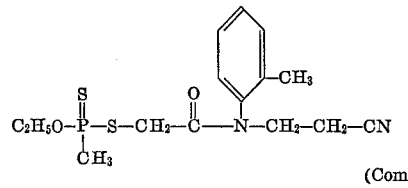

(Compound 36)

EXAMPLE 37

5.4 parts of α-chloro[N-(2-cyanoethyl)-N-(3-chloro-4-methylphenyl)] acetamide were reacted with 4 parts of ammonium O-ethyl methylphosphorodithioate using the procedure described in Example 1. 7.9 parts of α-(ethoxymethylphosphinothioylthio) - N - (2 - cyanoethyl)-N-(3-chloro-4-methylphenyl) acetamide, a viscous oil, having the following structural formula, as determined by infrared analysis, were obtained:

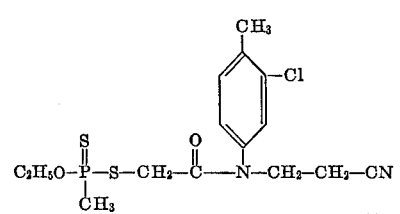

(Compound 37)

EXAMPLE 38

3.9 parts of α-chloro[N-(2-cyanoethyl)-N-(4-chlorophenyl)] acetamide were reacted with 3 parts of ammonium O-ethyl methylphosporodithioate using the procedure described in Example 1. 5.8 parts of α-(ethoxymethylphosphinothioylthio)-N-(2-cyanoethyl) - N - (4-chlorophenyl) acetamide, a viscous oil, having the following structural formula, as determined by infrared analysis, were obtained:

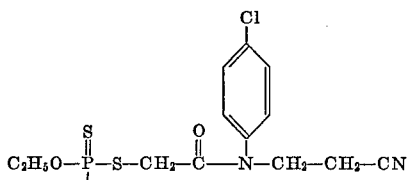

(Compound 38)

This compound was found to contain 10.2% chlorine (theory 9.4%).

EXAMPLE 39

5.4 parts of α-chloro[N-(2-cyanoethyl)-N-(2-thiomethylphenyl)] acetamide were reacted with 4 parts of ammonium O-ethyl methylphosphorodithioate using the procedure described in Example 1. 7.0 parts of α-ethoxymethylphosphinothioylthio) - N - (2 - cyanoethyl)-N-(2-thiomethylphenyl) acetamide, a viscous oil, having the following structural formula, as determined by infrared analysis, were obtained:

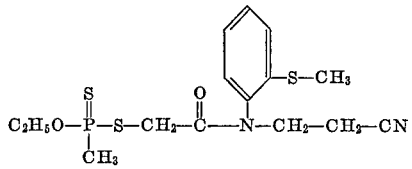

(Compound 39)

This compound was found to contain 21.8% sulfur (theory 24.7%).

EXAMPLE 40

5.4 parts of α-chloro[N-(2-cyanoethyl)-N-(4-thiomethylphenyl)] acetamide were reacted with 4 parts of ammonium O-ethyl methylphosphorodithioate using the procedure described in Example 1. 7.1 parts of α-(ethoxymethylphosphinothioylthio) - N - (2 - cyanoethyl)-N-(4-thiomethylphenyl) acetamide, a viscous oil, having the following structural formula, as determined by infrared analysis, were obtained:

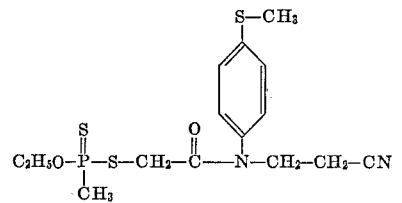

(Compound 40)

This compound was found to contain 23.2% sulfur (theory 24.7%).

EXAMPLE 41

5.4 parts of α-chloro[N-(2-cyanoethyl)-N-(3-thiomethylphenyl)] acetamide were reacted with 4 parts of ammonium O-ethyl methylphosphorodithioate using the procedure described in Example 1. 7.9 parts of α-(ethoxymethylphosphinothioylthio)-N-(2 - cyanoethyl) - N - (3-thiomethylphenyl) acetamide, a viscous oil, having the following structural formula, as determined by infrared analysis, were obtained:

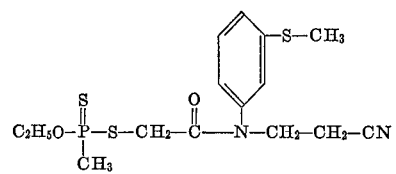

(Compound 41)

This compound was found to contain 22.6% sulfur (theory 24.7%).

EXAMPLE 42

4.4 parts of α-chloro[N-(2-cyanoethyl)-N-(4-carboethoxyphenyl)] acetamide were reacted with 3 parts of ammonium O-ethyl methylphosphorodithioate using the procedure described in Example 1. 6.5 parts of α-(ethoxymethylphosphinothioylthio) - N - (2 - cyanoethyl)-N-(4-carboethoxyphenyl) acetamide, a viscous oil, having the following structural formula, as determined by infrared analysis, were obtained:

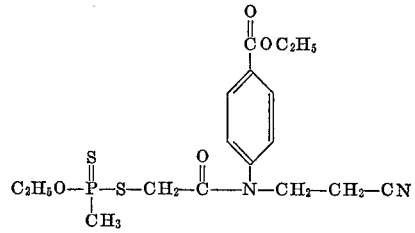

(Compound 42)

EXAMPLE 43

1 part of α-chloro(N-cyanomethyl-N-phenyl) acetamide was reacted with 2 parts of ammonium O,O-diethyl phosphorothioate using the procedure of Example 1. 1.5 parts of α - (diethoxyphosphinothio)-N-cyanomethyl-N-phenyl acetamide, a biscous oil, having the following structural formula, as determined by infrared analysis, were obtained:

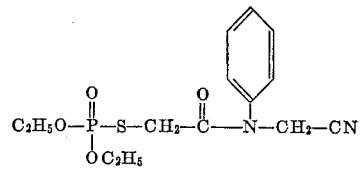

(Compound 43)

This compound was found to contain 10.3% sulfur (theory 9.4%).

EXAMPLE 44

1 part of α-chloro(N-cyanomethyl-N-phenyl)acetamide was reacted with 2 parts of ammonium O-ethyl methylphosphorodithioate using the procedure of Example 1. 1.5 parts of α-(ethoxymethylphosphinothioylthio)-N-cyanomethyl-N-phenyl acetamide, a viscous oil, having the following structural formula, as determined by infrared analysis, were obtained:

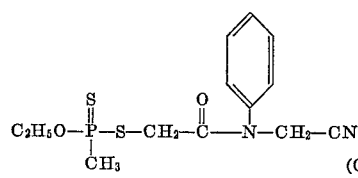

(Compound 44)

This compound was found to contain 9.06% phosphorus (theory 9.45%).

EXAMPLE 45

4 parts of α-chloro[(N-(2-cyanopropyl)-N-phenyl)] acetamide were reacted with 6 parts of ammonium O,O-diethyl phosphorodithioate using the procedure of Example 1. 6 parts of α-(diethoxyphosphinothioylthio)-N-(2-cyanopropyl)-N-phenyl acetamide, a viscous oil, having the following structural formula, as determined by infrared analysis, were obtained:

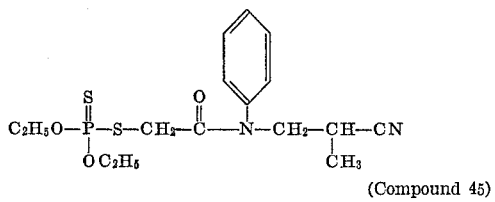

(Compound 45)

This compound was found to contain 9.0% phosphorus (theory 8.04%).

The haloacetamidonitrile reactant was prepared in the following manner:

32 parts of N-(2-cyanopropyl) aniline, 22.6 parts of chloroacetyl chloride and 16 parts of pyridine were reacted in a manner analogous to that employed in Example 1. 43 parts of α-chloro-N-(2-cyanopropyl)-N-phenyl acetamide, an oily liquid having the following structural formula, as determined by infrared analysis, were obtained:

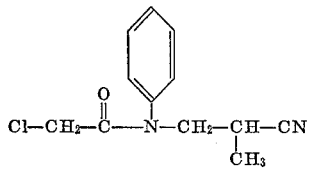

This compound was found to contain 10.2% nitrogen (theory 11.8%).

In a manner analogous to that described in the above examples, other compounds illustrative of the present invention may be prepared as follows:

α-(Diethoxyphosphinothioylthio)-N-(2 - cyanomethyl)-N-(2,4,6-trichlorophenyl) acetamide by reaction of α-chloro[N-(2-cyanomethyl) - N - (2,4,6-trichlorophenyl)] acetamide and ammonium O,O-diethyl phosphorodithioate.

α-(Methylethoxyphosphinothioylthio) - N - (2 - cyanomethyl) - N-(2-chloro-5-trifluoromethylphenyl) acetamide by reaction of α-chloro[N-(2-cyanomethyl)-N-(2-chloro-5-trifluoromethylphenyl)] acetamide and ammonium O-ethyl methylphosphorodithioate.

α-(Diethoxyphosphinothioylthio)-N-(2 - cyanomethyl)-N-(2-chloro-4-fluorophenyl) acetamide by reaction of α-chloro[N - (2-cyanomethyl)-N-(2-chloro-4-fluorophenyl)] acetamide and ammonium O,O-diethyl phosphorodithioate.

α-(Diethoxyphosphinothioylthio)-N-(2 - cyanomethyl)-N-(2-methyl-4-ethylphenyl) acetamide by reaction of α-chloro[N - (2-cyanomethyl)-N-(2-methyl-4-ethylphenyl)] acetamide and ammonium O,O-diethyl phosphorodithioate.

α-(Methylethoxyphosphinothioylthio) - N - (2-cyanomethyl)-N-(2-methyl-4-ethylphenyl) acetamide by reaction of α-chloro[N-(2-cyanomethyl)-N-(2-methyl-4-ethylphenyl)] acetamide and ammonium O-ethyl methylphosphorodithioate.

α-(Diethoxyphosphinothio)-N-(2-cyanoethyl) - N - (3-chloro-4-methylphenyl) acetamide by reaction of α-chloro [N-(2 - cyanoethyl)-N-(3-chloro-4-methylphenyl)] acetamide and ammonium O,O-diethyl phosphorothioate.

α-(Diethoxyphosphinothio)-N-(2-cyanoethyl)-N-(2-trichloromethylphenyl) acetamide by reaction of α-chloro [N-(2-cyanoethyl) - N - (2-trichloromethylphenyl)] acetamide and ammonium O,O-diethyl phosphorothioate.

α-(Diethoxyphosphinothio)-N-(2-cyanoethyl)-N-(2,4,6-trimethylphenyl) acetamide by reaction of α-chloro[N-(2-cyanoethyl)-N-(2,4,6-trimethylphenyl)] acetamide and ammonium O,O-diethyl phosphorothioate.

α-(Diethoxyphosphinothioylthio)-N-(2-cyanoethyl)-N-(2,4,6-trimethylphenyl) acetamide by reaction of α-chloro [N-(2-cyanoethyl)-N-(2,4,6-trimethylphenyl)] acetamide and ammonium O,O-diethyl phosphorodithioate.

α-(Methylethoxyphosphinothio)-N-(2-cyanopropyl)-N-(2,4,6-trichlorophenyl) acetamide by reaction of α-chloro [N-(2-cyanopropyl)-N-(2,4,6-trichlorophenyl)] acetamide and ammonium O-ethyl methylphosphorothioate.

α-(Methylethoxyphosphinothio)-N-(2 - cyanoethyl)-N-(2,4,6-trimethylphenyl) acetamide by reaction of α-chloro [N-(2-cyanoethyl)-N-(2,4,6-trimethylphenyl)] acetamide and ammonium O-ethyl methylphosphorothioate.

α-(Dimethoxyphosphinothio) - N - (2-cyanoethyl)-N-(2,4-dimethoxyphenyl) acetamide by reaction of α-bromo [N-(2-cyanoethyl)-N-(2,4-dimethoxyphenyl)] acetamide and ammonium O,O-dimethyl phosphorothioate.

α-(Methylethoxyphosphinothio)-N-(2-cyanomethyl)-N-(2,4-dimethoxyphenyl) acetamide by reaction of α-bromo [N-(2-cyanomethyl) - N - (2,4-dimethoxyphenyl)] acetamide and ammonium O-ethyl methylphosphorothioate.

α-(Diethoxyphosphinothio)-N-(2 - cyanopropyl)-N-(2-methoxy-4-chlorophenyl) acetamide by reaction of α-bromo[N-(2 - cyanopropyl)-N-(2-methoxy-4-chlorophenyl)] acetamide and ammonium O,O-diethyl phosphorothioate.

α-(Methylethoxyphosphinothio)-N-(2 - cyanoethyl)-N-(2-methoxy-4-chlorophenyl) acetamide by reaction of α-bromo[N-(2-cyanoethyl) - N - (2-methoxy-4-chlorophenyl)] acetamide and ammonium O-ethyl methylphosphorothioate.

α-(Diethoxyphosphinothioylthio)-N-(2 - cyanomethyl)-N-(2-methoxy-4-ethoxyphenyl) acetamide by reaction of α-bromo[N-(2-cyanomethyl) - N - (2-methoxy-4-ethoxyphenyl)] acetamide and ammonium O,O-diethyl phosphorodithioate.

α-(Diethoxyphosphinothio)-N-(2-cyanoethyl)-N - (2-acetoxyphenyl) acetamide by reaction of α-chloro[N-(2-cyanoethyl)-N-(2 - acetoxyphenyl)] acetamide and ammonium O,O-diethyl phosphorothioate.

α-(Methylethoxyphosphinothio)-N-(2-cyanoethyl) - N-(2-acetoxyphenyl) acetamide by reaction of α-chloro[N-(2-cyanoethyl)-N-(2-acetoxyphenyl)] acetamide and ammonium O-ethyl methylphosphorothioate.

α-(Diethoxyphosphinothio)-N-(2-cyanoethyl)-N - (2-carboethoxyphenyl) acetamide by reaction of α-chloro[N-(2-cyanoethyl)-N-(2-carboethoxyphenyl)] acetamide and ammonium O,O-diethyl phosphorothioate.

α-(Methylethoxyphosphinothio)-N-(2-cyanoethyl) - N-(2-carboethoxyphenyl) acetamide by reaction of α-chloro [N-(2-cyanoethyl)-N-(2-carboethoxyphenyl)] acetamide and ammonium O-ethyl methylphosphorothioate.

α - (Dimethoxyphosphinothio) - N-(2-cyanoethyl)-N-(4-phenylphenyl) acetamide by reaction of α-chloro[N-(2-cyanoethyl)-N-(4-phenylphenyl)] acetamide and ammonium O,O-dimethyl phosphorothioate.

α-(Methylethoxyphosphinothio)-N-(2-cyanoethyl) - N-(4-phenylphenyl) acetamide by reaction of α-chloro[N-(2-cyanoethyl)-N-(4-phenylphenyl)] acetamide and ammonium O-ethyl methylphosphorothioate.

α-(Diethoxyphosphinothio)-N-(2-cyanoethyl)-N - [4-(4-chlorophenyl) phenyl] acetamide by reaction of α-chloro[N-(2-cyanoethyl)-N-(4-[4-chlorophenyl]phenyl)] acetamide and ammonium O,O-diethylphosphorothioate.

α-(Methylethoxyphosphinothio)-N-(2-cyanoethyl) - N-[4-(4-chlorophenyl) phenyl] acetamide by reaction of α-chloro[N-(2-cyanoethyl)-N-(4-[4-chlorophenyl] phenyl)]

acetamide and ammonium O-ethyl methylphosphorothioate.

α-(Diethoxyphosphinothio)-N-(2-cyanoethyl)-N - (4-chloronaphthyl) acetamide by reaction of α-chloro[N-(2-cyanoethyl)-N-(4-chloronaphthyl)] acetamide and ammonium O-O-diethylphosphorothioate.

α - (Methylethoxyphosphinothio) - N-(2-cyanoethyl)-N-(4-chloronaphthyl) acetamide by reaction of α-chloro[N-(2-cyanoethyl)-N-(4-chloronaphthyl)] acetamide and ammonium O-ethyl methylphosphorothioate.

α - (Diethoxyphosphinothioylthio)-N-(2-cyanoethyl)-N-(4-phenoxyphenyl) acetamide by reaction of α-chloro [N-(2-cyanoethyl) - N-(4 - phenoxyphenyl)] acetamide and ammonium O,O-diethyl phosphorodithioate.

α - (Methylethoxyphosphinothioylthio) - N-(2-cyanoethyl)-N-(4-phenoxyphenyl) acetamide by reaction of α-chloro[N-(2-cyanoethyl) - N-(4-phenoxyphenyl)] acetamide and ammonium O-ethyl methylphosphorodithioate.

The compounds of this invention are useful as toxicants for combating a wide variety of insect pests. It will be understood that the insects contemplated herein include not only those small invertebrate animals belonging mostly to the class Insecta, comprising six-legged, usually winged forms as flies, moths, beetles, bees and their immature forms, but also includes other allied classes of arthropods whose members are wingless and usually have more than six legs as mites, spides and centipedes.

Although the compounds of the present invention are useful per se in combatting a wide variety of insect pests, it is preferred that the compounds be supplied to the pests or to the environment of the pest or pests in conjunction with a major proportion of a carrier which may be a solid, liquid or gaseous material, the invention compounds constituting the toxic ingredient of such compositions. The toxicant compounds may be employed either in the form of aqueous sprays or dust compositions and the amount of toxicant used in combatting the insect pests may vary considerably provided a sufficient quantity is used to provide the desired toxicity.

When employed in the form of a powder or dust for killing pests, the toxicant compounds may be mixed with a substantial portion of any suitable inert material or diluent, preferably in finely divided form, such as known grades of prepared paraciticide carrier clays, pyrophyllite, Fuller's earth, bentonite, sulfur, lime, talc, whiting, diatomaceous earth, etc. Suitable dusts of this type usually contain not less than 0.1% and preferably not less than 1.0% by weight of toxicant.

Liquid pesticide sprays containing the toxicants of this invention may be prepared by first forming a solution of the compound in a suitable organic solvent, e.g., xylene, methylated naphthalenes, acetone, hexane, dioxane, methyl ethyl ketone, solvent naphtha or any highly aromatic petroleum-type paraciticide oil, and preferably adding a small amount of emulsifying agent commonly employed in the art such as diglycol oleate, p-isooctyl phenyl ether of polyethylene glycol, sodium decylbenzene sulfonate and sodium dodecylbenzene sulfonate. The resulting concentrate solution, usually containing about 1 to 8 pounds of the toxicant per gallon of organic solvent, is incorporated with water in quantity sufficient to form an aqueous dispersion or emulsion having the desired active ingredient concentration.

In a preferred embodiment, aqueous spray dispersions or emulsions may be formed by incorporating in water dry mixtures or so-called wettable spray powders containing the toxicants of the invention, generally in an amount of about 15 to 25 weight percent, based on the weight of the powder. These mixtures may also include inert diluents, suitable quantities of wetting and dispersing agents and, if desired, secondary toxicants.

The aqueous spray dispersions of the invention preferably should contain the active ingredient in an amount not less than ⅛ of an ounce per 100 gallons of spray, the more usual concentration being in the range of 1/16 to ½ of a pound per 100 gallons of spray.

Many of the toxicant compounds of this invention are not only effective as contact and stomach toxicants but are also extremely toxic when used as systemic toxicants for killing pests which invade plants. In such use, the toxicant, with or without a suitable carrier or diluent, can be applied to soil in the vicinity of the growing plants to be protected, the toxicant being absorbed by the plants. Alternatively, the toxicant can be applied directly to portions of the plant where it is again absorbed and distributed throughout the plant tissue, including portions not directly treated. In either case, the whole plant then becomes toxic to pests which feed on it.

Following Tables I and II contain the results of tests relating to use of a number of typical toxicant compounds of the invention as contact pesticides.

TABLE I

| Toxicant Compound | Formulation | Mites [a] (percent kill) | Pea Aphids [b] (percent kill) | Mexican Bean Beetle Larvae [c] (percent kill) | Southern Army Worm Larvae [d] (percent kill) |
| --- | --- | --- | --- | --- | --- |
| 1 | Toxicant composition [1] diluted in water.[2] | 100 | | 100 | 100 |
| 2 | do | 100 | | 80 | |
| 3 | do | 100 | 100 | 100 | 100 |
| 4 | do | 97.3 | | 100 | 100 |
| 5 | do | 100 | | 100 | 80 |
| 6 | do | 100 | | 100 | |
| 7 | do | 100 | | 100 | 80 |
| 8 | do | 100 | 80 | 100 | 100 |
| 9 | do | 100 | | 100 | |
| 10 | do | 100 | | 100 | |
| 11 | do | 100 | | 100 | 80 |
| 12 | do | 100 | | 100 | 80 |
| 13 | do | 100 | | 100 | |
| 14 | do | 100 | | | |
| 15 | do | 100 | | 100 | 100 |
| 16 | do | 100 | | 100 | |
| 17 | do | 100 | | 100 | |
| 18 | do | 100 | | 100 | |
| 19 | do | 100 | | 100 | |
| 20 | do | 100 | | 100 | |
| 21 | do | 100 | | 80 | |
| 22 | do | 100 | | 80 | 100 |
| 23 | do | 100 | | 100 | |
| 24 | do | | | 100 | |
| 26 | do | | | 75 | |
| 29 | do | 100 | 100 | 100 | 100 |
| 30 | do | 100 | | 100 | 100 |
| 31 | do | 100 | 100 | 100 | 100 |
| 32 | do | 100 | | 100 | |
| 33 | do | 100 | | 100 | 100 |
| 34 | do | 100 | | 100 | 100 |
| 35 | do | 100 | 70 | 100 | 100 |
| 36 | do | 100 | 100 | 100 | 100 |
| 37 | do | 100 | | 100 | |
| 38 | do | 100 | | 100 | 80 |
| 39 | do | 100 | | 100 | |
| 40 | do | 100 | | 100 | |
| 41 | do | 100 | | | |

[1] 4.8 grams of toxicant compound dissolved in acetone to 100 cc.

[2] In tests on toxicity to mites a formulation consisting of 1 part toxicant composition per 79 parts water was used, i.e., ½ pound toxicant per 100 gallons of water.

In tests on toxicity to pea aphids and Mexican bean beetle larvae a formulation consisting of 1 part toxicant composition per 639 parts water was used, i.e., 1 ounce of toxicant per 100 gallons of water.

In tests on toxicity to southern armyworm larvae a formulation consisting of 1 part toxicant composition per 159 parts water was used, i.e., ¼ pound toxicant per 100 gallons of water.

[a] The mite tests were run on "red spider" (*Tetranychus telarius*) by spraying the indicated formulation onto horticultural (cranberry) bean plants infested with the mites. Following treatment, the plants were stored on racks on irrigated trays in a greenhouse. Observations on kill were made 3 days after treatment.

[b] The tests on toxicity to pea aphids (*Macrosiphum pisi*) were run by removing the pea aphids from infested broad bean plants, placing them on a wire screen and spraying them with the indicated formulation. Following treatment, the pea aphids were confined to untreated broad bean plants. Record of kill was made 3 days after treatment.

[c] The tests on toxicity to Mexican bean beetle larvae (*Epilachna varivestis*) were run by spraying horticultural (cranberry) bean plants with the indicated formulation and allowing the plants to dry. The larvae were confined to the treated foliage by means of wire cages. Record of kill was made 3 days after treatment.

[d] The tests on toxicity to southern armyworms (*Prodenia eridania*) were carried out by spraying horticultural (cranberry) bean plants with the indicated formulation and allowing the plants to dry. Armyworm larvae were confined to the treated foliage by means of wire cages. Mortality count was made four days after treatment.

TABLE II

| Toxicant Compound | Formulation | Houseflies[a] (percent kill) |
|---|---|---|
| 1 | Bait[b] containing 0.313% by weight of toxicant compound. | [c]95.4 |
| 25 | do | [d]98.0 |
| 42 | do | [d]100 |
| 2 | Bait[b] containing 0.125% by weight of toxicant compound. | [e]100 |
| 3 | do | [f]92 |
| 16 | do | [e]100 |
| 19 | do | [e]87 |
| 20 | do | [e]96 |
| 21 | do | [e]100 |
| 22 | do | [e]100 |
| 33 | do | [e]100 |
| 36 | do | [e]98 |
| 37 | do | [e]100 |
| 38 | do | [e]98 |
| 41 | do | [e]100 |

[a] The tests on toxicity to houseflies (*Musca domestica*) were run by placing the formulation in emergence cages containing fly pupae. Cages containing bait untreated with the toxicant compound were used as checks. Examination of each cage was made after the indicated time to determine toxicity.
[b] The bait consists of powdered non-fat dry milk (44%), granulated sugar (44%) and powdered egg (12%).
[c] Percent kill was recorded 9 days after confinement.
[d] Percent kill was recorded 10 days after confinement.
[e] Percent kill was recorded 7 days after confinement.
[f] Percent kill was recorded 8 days after confinement.

Following Table III illustrates systemic pesticide activity of some of the toxicant compounds coming within the scope of this invention. The tests were conducted by placing 100 cc. of the indicated formulation in a glass container along with the test plants (roots being washed free of soil). The plant foliage was infested with the pests 1 day later and mortality was noted 3 days after infestation.

TABLE III

| Toxicant Compound | Formulation | Mexican Bean Beetle Larvae[a] (percent kill) | Pea Aphids[b] (percent kill) | Southern Army-worm Larvae[a] (percent kill) | Mites[a] (percent kill) |
|---|---|---|---|---|---|
| 1 | 1 part toxicant composition[e] per 159 parts water. | 100 | 100 | 100 | 100 |
| 2 | do | 100 | 100 | 75 | 100 |
| 3 | do | 100 | 100 | 100 | 100 |
| 4 | do | 80 | 100 | | 94.5 |
| 5 | do | 100 | 100 | 100 | 100 |
| 6 | do | 100 | 100 | 100 | 100 |
| 7 | do | 100 | 100 | | 100 |
| 8 | do | 100 | 100 | 100 | 100 |
| 10 | do | | 100 | | |
| 11 | do | | 100 | 87.6 | 100 |
| 12 | do | 100 | 100 | 100 | 100 |
| 13 | do | | 100 | | 100 |
| 14 | do | 80 | 100 | | 100 |
| 15 | do | | 100 | | |
| 19 | do | 80 | 100 | | 100 |
| 22 | do | | 100 | | 100 |
| 24 | do | | 100 | | |
| 26 | do | 100 | 100 | | 95.3 |
| 29 | do | 100 | 100 | 100 | 100 |
| 30 | do | 100 | 100 | 100 | 100 |
| 31 | do | 100 | 100 | 100 | 100 |
| 33 | do | 100 | 100 | 100 | 100 |
| 34 | do | | 80 | 100 | |
| 35 | do | 80 | 100 | 85.6 | 73.7 |
| 36 | do | | 100 | 100 | 100 |
| 38 | do | | 100 | 100 | 100 |
| 39 | do | 100 | 100 | 87.6 | 100 |
| 40 | do | 100 | | | |

[a] The test plants were horticultural (cranberry) bean plants.
[b] Test plants were English broad bean plants.
[e] 4.8 grams of toxicant compound dissolved in acetone to 100 cc.

From the foregoing, it is apparent that we have discovered a series of novel and valuable compounds possessing outstanding value as pesticides.

Since various changes and modifications may be made in the invention without departing from the spirit thereof, it is intended that all matter contained in the above description shall be interpreted as illustrative and not in a limiting sense.

We claim:
1. A compound having the structural formula:

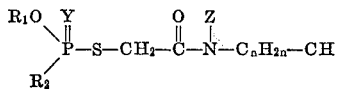

in which Y is a chalcogen selected from the group consisting of oxygen and sulfur, $R_1$ is an alkyl radical having from 1 to 6 carbons, $R_2$ is a member selected from the group consisting of alkyl and alkoxy radicals having from 1 to 6 carbons, $n$ is an integer from 1 to 6 and Z is an aryl radical.

2. A phosphate compound having the structural formula:

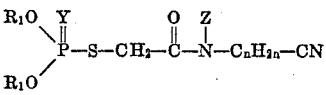

in which Y is a chalcogen having an atomic weight not greater than about 33, $R_1$ is an alkyl radical having from 1 to 6 carbons, $n$ is an integer from 1 to 6 and Z is an aryl radical.

3. A phosphate compound having the structural formula:

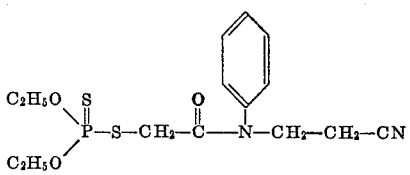

4. A phospate compound having the structural formula:

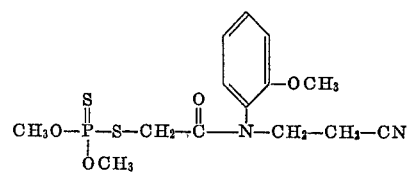

5. A phosphate compound having the structural formula:

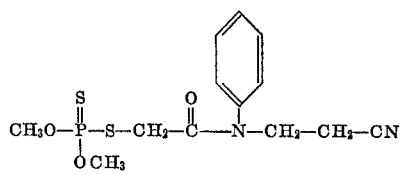

6. A phosphate compound having the structural formula:

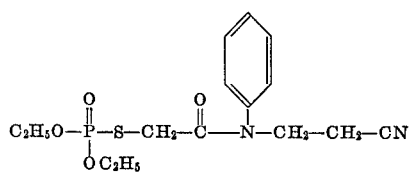

7. A phosphate compound having the structural formula:

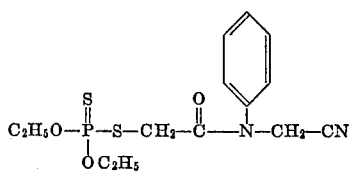

8. A phosphonate compound having the structural formula:

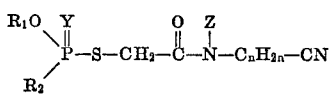

in which Y is a chalcogen having an atomic weight not greater than about 33, $R_1$ and $R_2$ are alkyl radicals having from 1 to 6 carbons, $n$ is an integer from 1 to 6 and Z is an aryl radical.

9. A phosphonate compound having the structural formula:

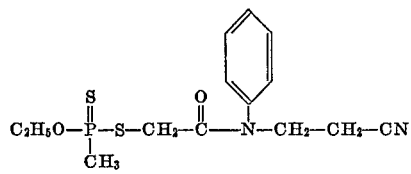

10. A phosphonate compound having the structural formula:

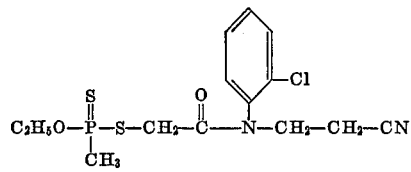

11. A phosphonate compound having the structural formula:

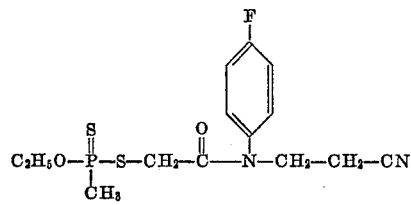

12. A phosphonate compound having the structural formula:

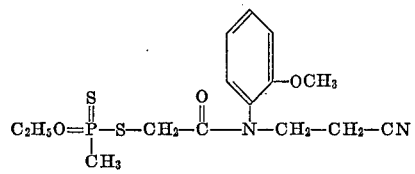

13. A phosphonate compound having the structural formula:

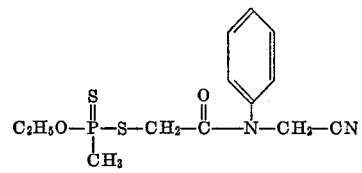

References Cited
UNITED STATES PATENTS
3,033,744  5/1962  Losco et al. _____ 260—940 XR CHARLES B. PARKER, *Primary Examiner.*
A. H. SUTTO, *Assistant Examiner.*

U.S. Cl. X.R.
260—465, 978; 424—210

UNITED STATES PATENT OFFICE
CERTIFICATE OF CORRECTION

Patent No. 3,420,919            January 7, 1969

Peter E. Newallis et al.

It is certified that error appears in the above identified patent and that said Letters Patent are hereby corrected as shown below:

Column 1, lines 56 and 61, "substitutents", each occurrence, should read -- substituents --. Column 2, lines 60 to 62, the formula should appear as shown below:

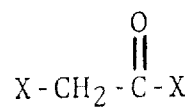

Column 4, line 73, "[N-2-cyanoethyl)-" should read -- [-(2-cyanoethyl)- --. Column 6, line 63, before "melting" insert an opening parenthesis. Column 7, line 50, "17-" should read -- 7 --. Column 8, lines 22 to 30, that portion of the formula reading

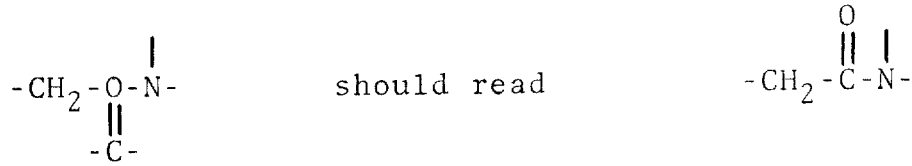

Same column 8, lines 60 to 67, that portion of the formula reading

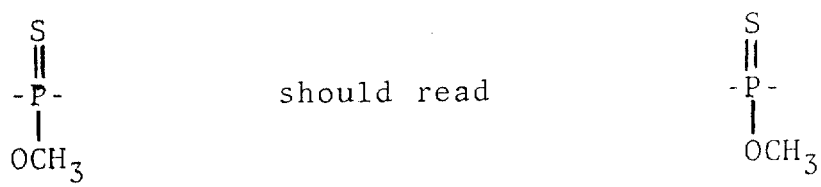

Column 9, lines 3 to 10, the formula should appear as shown below:

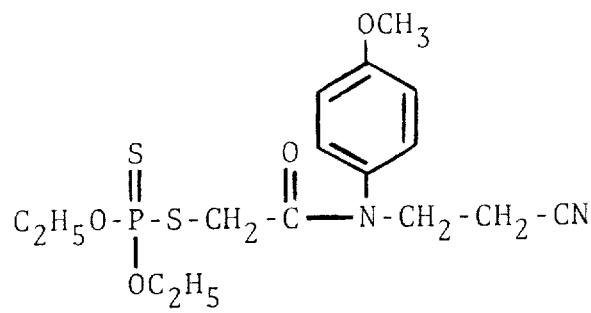

same column 9, lines 42 to 50, that portion of the formula reading

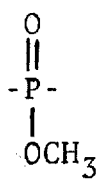     should read     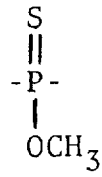

Column 12, lines 10 to 15, that portion of the formula reading "-CH$_2$-CH-CN" should read -- -CH$_2$-CH$_2$-CN --. Column 14, lines 5 to 10, that portion of the formula reading

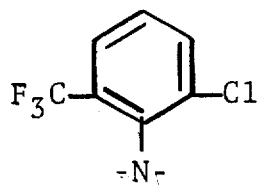     should read     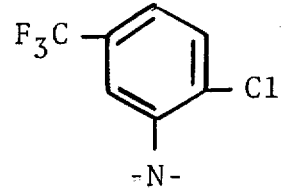

Column 18, line 20, "α-ethoxy-" should read -- α-(ethoxy- --; line 40, "[N-2" should read -- [N-(2 --. Column 19, line 7, "methylphosporodithioate" should read -- methylphosphorodithioate --; line 31, "α-ethoxy-" should read -- α-(ethoxy- --. Column 20, line 43, "biscous" should read -- viscous --. Column 23, line 27, "spides" should read -- spiders --. Column 25, TABLE II, footnote a, line 2 thereof, "formulation" should read -- formulations --; same column 25, lines 71 to 74, that portion of the formula reading "-C$_n$H$_{2n}$-CH" should read -- -C$_n$H$_{2n}$-CN --. Column 28, lines 3 to 9, that portion of the formula reading

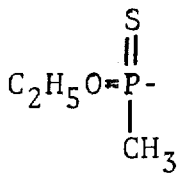     should read     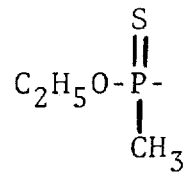

Signed and sealed this 24th day of March 1970.

(SEAL)
Attest:

EDWARD M. FLETCHER, JR.
Attesting Officer

WILLIAM E. SCHUYLER, JR.
Commissioner of Patents